(12) United States Patent
Katoh et al.

(10) Patent No.: US 11,491,900 B2
(45) Date of Patent: Nov. 8, 2022

(54) HANGING TYPE SEAT

(71) Applicant: Toyota Jidosha Kabushiki Kaisha, Toyota (JP)

(72) Inventors: Kohshi Katoh, Toyota (JP); Tetsuya Nagai, Okazaki (JP); Ken Motozawa, Nisshin (JP); Mitsuru Asai, Nisshin (JP); Takayuki Mori, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 205 days.

(21) Appl. No.: 16/898,898

(22) Filed: Jun. 11, 2020

(65) Prior Publication Data

US 2020/0391635 A1 Dec. 17, 2020

(30) Foreign Application Priority Data

Jun. 14, 2019 (JP) .............................. JP2019-111464

(51) Int. Cl.
*B60N 2/70* (2006.01)
*A45F 3/24* (2006.01)

(52) U.S. Cl.
CPC .............. *B60N 2/7011* (2013.01); *A45F 3/24* (2013.01)

(58) Field of Classification Search
CPC . A45F 3/22; A45F 3/24; B60N 2/7011; B60N 3/008
See application file for complete search history.

(56) References Cited

U.S. PATENT DOCUMENTS

| | | | | |
|---|---|---|---|---|
| 1,138,820 A | * | 5/1915 | Wersel, Jr. ................. | A45F 3/22 5/124 |
| 1,369,638 A | * | 2/1921 | Edmonds ................ | A47K 3/125 4/573.1 |
| 2,163,198 A | * | 6/1939 | Gossard ............... | B61D 33/005 297/423.27 |
| 2,260,584 A | * | 10/1941 | Schuck ..................... | A47D 7/04 24/457 |
| 2,348,217 A | * | 5/1944 | Jones ......................... | A45F 3/22 5/118 |
| 2,601,488 A | * | 6/1952 | Allen ...................... | B60N 2/345 5/94 |

(Continued)

FOREIGN PATENT DOCUMENTS

| | | | | |
|---|---|---|---|---|
| CN | 101712291 A | * | 5/2010 | ....... B29C 45/14631 |
| DE | 202018102328 U1 | * | 6/2018 | ............... A45F 3/22 |

(Continued)

*Primary Examiner* — James M Ference
(74) *Attorney, Agent, or Firm* — Dinsmore & Shohl LLP

(57) ABSTRACT

A hanging type seat mounted in a vehicle comprises a seat main body for supporting an occupant from below; one or more front hanging tools which are passed across a front part of the seat main body, extended upward in the front-back direction, and attached to a structure in the vehicle; one or more rear hanging tools which are passed across a rear part of the seat main body, extended upward in the front-back direction, and attached to a structure in the vehicle; and two or more transverse hanging tools which are passed across both sides of the seat main body, extended laterally upward, and attached to a structure in the vehicle; wherein the seat main body is hung and held by the one or more front hanging tools, the one or more rear hanging tools, and the two or more transverse hanging tools.

8 Claims, 14 Drawing Sheets

(56) References Cited

U.S. PATENT DOCUMENTS

| | | | | |
|---|---|---|---|---|
| 2,829,702 | A * | 4/1958 | Keating | B64D 11/0647 297/452.64 |
| 3,314,720 | A * | 4/1967 | Millington | B64D 11/0698 297/483 |
| 3,454,968 | A * | 7/1969 | Beckman | A47D 7/04 5/118 |
| 3,524,673 | A * | 8/1970 | Beeson | B62D 33/0612 5/118 |
| 4,221,424 | A * | 9/1980 | Eiserman | B62D 33/0612 5/120 |
| 4,258,951 | A * | 3/1981 | Groom | A47C 4/286 297/16.2 |
| 4,474,347 | A * | 10/1984 | Mazelsky | B60N 2/42736 188/371 |
| 4,602,816 | A * | 7/1986 | Chandler | B60N 2/3075 297/14 |
| 5,170,521 | A * | 12/1992 | Light | A47C 17/84 5/118 |
| 5,342,111 | A * | 8/1994 | Charles | B60N 2/7011 297/255 |
| 5,806,910 | A * | 9/1998 | DeRees | B60N 2/015 297/452.13 |
| 5,944,381 | A * | 8/1999 | Nguyen | A47C 3/0255 297/452.13 |
| 6,199,252 | B1 * | 3/2001 | Masters | B60R 22/26 297/218.3 |
| 6,550,858 | B1 * | 4/2003 | Grohs | B60N 2/4256 297/452.33 |
| 7,234,177 | B1 * | 6/2007 | Drevitson | A45F 3/22 5/120 |
| 7,513,558 | B2 * | 4/2009 | Hansen | B60N 2/42 296/68.1 |
| 7,905,545 | B2 * | 3/2011 | Andersson | B60N 2/0232 297/452.52 |
| 8,333,420 | B2 * | 12/2012 | Mehl | F41H 7/046 296/63 |
| 9,101,203 | B2 * | 8/2015 | Ely | A45F 3/24 |
| 9,283,868 | B2 * | 3/2016 | Sugiyama | B60N 2/0244 |
| 9,873,364 | B2 * | 1/2018 | Hamabe | B60N 2/68 |
| 9,937,820 | B2 * | 4/2018 | Hamabe | B60N 2/7094 |
| 10,239,421 | B2 * | 3/2019 | Katoh | B60N 2/39 |
| 10,293,731 | B2 * | 5/2019 | Saunders | A47C 17/645 |
| 10,328,825 | B2 * | 6/2019 | Hamabe | B60N 2/646 |
| 10,377,275 | B2 * | 8/2019 | Ketels | B60N 2/504 |
| 10,493,878 | B2 * | 12/2019 | Ketels | B60N 2/504 |
| 10,682,938 | B2 * | 6/2020 | Katoh | B60N 2/68 |
| 10,710,487 | B2 * | 7/2020 | Welch | B60N 2/0292 |
| 2008/0048067 | A1 * | 2/2008 | Pilgram | B64D 11/0647 244/122 R |
| 2008/0203805 | A1 * | 8/2008 | Hansen | B60N 2/7011 297/452.63 |
| 2008/0217971 | A1 * | 9/2008 | Paluch | B60N 2/809 297/216.12 |
| 2008/0290707 | A1 * | 11/2008 | Schramek-Flye | A47D 1/103 297/255 |
| 2009/0070930 | A1 * | 3/2009 | Roman | B62B 3/1456 5/120 |
| 2009/0205131 | A1 * | 8/2009 | Bishop | A45F 3/24 5/118 |
| 2010/0060060 | A1 * | 3/2010 | Hansen | B60N 2/01 297/484 |
| 2010/0102602 | A1 * | 4/2010 | Hansen | B64D 11/0619 297/216.1 |
| 2010/0109387 | A1 * | 5/2010 | Merensky | B64D 11/0601 297/340 |
| 2014/0345048 | A1 * | 11/2014 | Mueller | A45F 3/24 5/119 |
| 2015/0173496 | A1 * | 6/2015 | Ely | A45F 3/24 5/118 |
| 2015/0239381 | A1 * | 8/2015 | Hamabe | B60N 2/39 297/313 |
| 2015/0367756 | A1 * | 12/2015 | Katoh | B60N 2/68 297/285 |
| 2016/0009199 | A1 * | 1/2016 | Hamabe | B60N 2/646 297/452.18 |
| 2017/0127807 | A1 * | 5/2017 | Lindberg | A45F 3/22 |
| 2017/0202344 | A1 * | 7/2017 | Ressler | A45C 13/103 |
| 2017/0217350 | A1 * | 8/2017 | Saunders | A47C 17/80 |
| 2017/0320424 | A1 * | 11/2017 | Eddy | A45F 3/24 |
| 2018/0170214 | A1 * | 6/2018 | Hamabe | B60N 2/7011 |
| 2019/0001844 | A1 * | 1/2019 | Williams | B60N 2/0248 |
| 2019/0263306 | A1 * | 8/2019 | Welch | B60N 2/345 |
| 2019/0328115 | A1 * | 10/2019 | Grisar | A45F 3/26 |
| 2020/0391635 | A1 * | 12/2020 | Katoh | B60N 2/7011 |

FOREIGN PATENT DOCUMENTS

| | | |
|---|---|---|
| JP | 2000-333732 A | 12/2000 |
| JP | 2006-081685 A | 3/2006 |
| JP | 2017-196436 A | 11/2017 |

* cited by examiner

HANGING TYPE SEAT

CROSS REFERENCE TO RELATED APPLICATION

This application claims priority to Japanese Patent Application No. 2019-111464 filed on Jun. 14, 2019, which is incorporated herein by reference in its entirety including the specification, claims, drawings, and abstract.

TECHNICAL FIELD

This specification discloses a hanging type seat which is hung and held in a vehicle.

BACKGROUND

It is widely known that a vehicle-mounted seat generally has a chair type form which is formed by covering the surface of a hard skeleton member with a cushion member. However, such a vehicle-mounted seat having a chair type form tends to become large and heavy because it requires a hard and heavy skeleton member.

JP 2000-333732 A discloses a hammock-like car accessory used in a three-row seat vehicle. This car accessory has a hammock-like structure in which a net is attached to the inside of a rope-type frame and a hook part is provided at the front and rear of the frame. When this car accessory is used, the seatback of a second seat is folded flat, the front hook part is hooked to the headrest of a first seat, and the rear hook part is hooked to the headrest of a third seat so as to hang the car accessory in the same way as a hammock.

For the car accessory of JP 2000-333732 A, its weight can be reduced significantly in comparison with a vehicle-mounted seat having a chair type form. However, the car accessory of JP 2000-333732 A is exclusively used for sleeping in a vehicle and it is not a seat to be seated by an occupant when the vehicle travels. The car accessory of JP 2000-333732 A has a frame hanging-holding member provided only at both of front and rear sides of the frame. In such a case, the car accessory tends to rotate (rolling movement) around the axis extended in the front-back direction, making it hard to keep the occupant in a stable posture.

SUMMARY

Accordingly, the present specification discloses a vehicle-mounted hanging type seat that can keep the occupant in a stable posture and can be reduced in weight.

The hanging type seat disclosed in this specification is a hanging type seat mounted in a vehicle, comprising a seat main body for supporting an occupant from below; one or more front hanging tools which are passed across a front part of the seat main body, extended upward in the front-back direction, and attached to a structure in the vehicle; one or more rear hanging tools which are passed across a rear part of the seat main body, extended upward in the front-back direction, and attached to a structure in the vehicle; and two or more transverse hanging tools which are passed across both sides of the seat main body, extended laterally upward, and attached to a structure in the vehicle; wherein the seat main body is hung and held by the one or more front hanging tools, the one or more rear hanging tools, and the two or more transverse hanging tools.

The seat main body is hung and held by the hanging tools attached to the car interior structure, so that the skeleton member for maintaining the posture of the seat main body is made unnecessary and the weight can be reduced. In addition, the transverse hanging tools extended in the lateral direction are provided in addition to the front hanging tool and the rear hanging tool provided at both of front and rear sides of the seat main body, so that an excessive rolling movement of the seat main body can be suppressed, and riding comfort for the occupant can be improved.

In this case, the seat main body is at least divided into a first support member on which at least the back of the occupant is positioned, and a second support member on which at least the buttocks of the occupant are positioned.

By configuring as described above, the movement of the upper half body of the occupant including the back of the occupant and the movement of the lower half body including the buttocks can be divided, and the movements of the upper half body and the lower half body can be adjusted separately.

In this case, the first support member may include a net member which is configured by combining plural wires into a net form and on which at least the back of the occupant is positioned.

By configuring as described above, the net member is flexibly deformed according to the body type of the occupant, so that the occupant can be supported appropriately even when the occupant has a different body type.

In this case, the transverse hanging tools are respectively extended from both sides of the first support member but are not necessarily extended from the second support member.

By configuring as described above, the second support member more easily causes a rolling movement than the first support member. As a result, the vibration inputted through the vehicle from a road surface can be absorbed by the rolling movement of the lower half body, and the position and posture of the upper half body can be further stabilized.

The transverse hanging tools may be respectively extended from both sides of the first support member and those of the second support member.

By configuring as described above, the rolling movement of the lower half body can also be suppressed in addition to the upper half body.

A reference plate, which is attached to the seat main body and has engaging portions with which starting points of the hanging tools are engageable, is further provided, and each starting point of at least one of the one or more rear hanging tools and at least two of the two or more transverse hanging tools may be engaged with the engaging portions of the reference plate.

The provision of the reference plate facilitates positioning of the rear hanging tool and the front hanging tool. The rear hanging tool and the front hanging tool have the starting points at the same reference plate, so that the seat main body is stably hung on the basis of the reference plate. As a result, the riding comfort for the occupant can be improved.

The vehicle disclosed in this specification is provided with an elastic frame which is a vehicle skeleton having elasticity, extended in the front-back direction of the vehicle and curved upward in a convex shape; a front vehicle body member coupled with a front part of the elastic frame; a rear vehicle body member coupled with a rear part of the elastic frame; a battery which is arranged between the front vehicle body member and the rear vehicle body member and below the elastic frame; a seat main body for supporting at least the back of the occupant from below; and plural hanging tools which hang and hold the seat main body and are at least partly attached to the elastic frame.

The onboard hanging type seat disclosed in this specification can stably maintain the occupant posture and its weight can be reduced.

BRIEF DESCRIPTION OF DRAWINGS

Embodiment(s) of the present disclosure will be described based on the following figures, wherein.

DESCRIPTION OF EMBODIMENTS

A structure of a hanging type seat 11 is described below with reference to the drawings. In the following description, unless specifically described otherwise, "forward" and "rearward" mean a "horizontal foot toe side" and a "horizontal head side," respectively, as seen from an occupant 100 lying on the hanging type seat 11. Similarly, unless specifically described otherwise, a "right direction" and a "left direction" mean a horizontally right-hand side and a horizontally left-hand side. Moreover, a "vertical direction" denotes a direction which intersects perpendicularly with longitudinal and lateral directions. In the respective figures, "Fr", "Up", and "R" denote respectively the above-described forward, upward and right directions.

Figure 1:
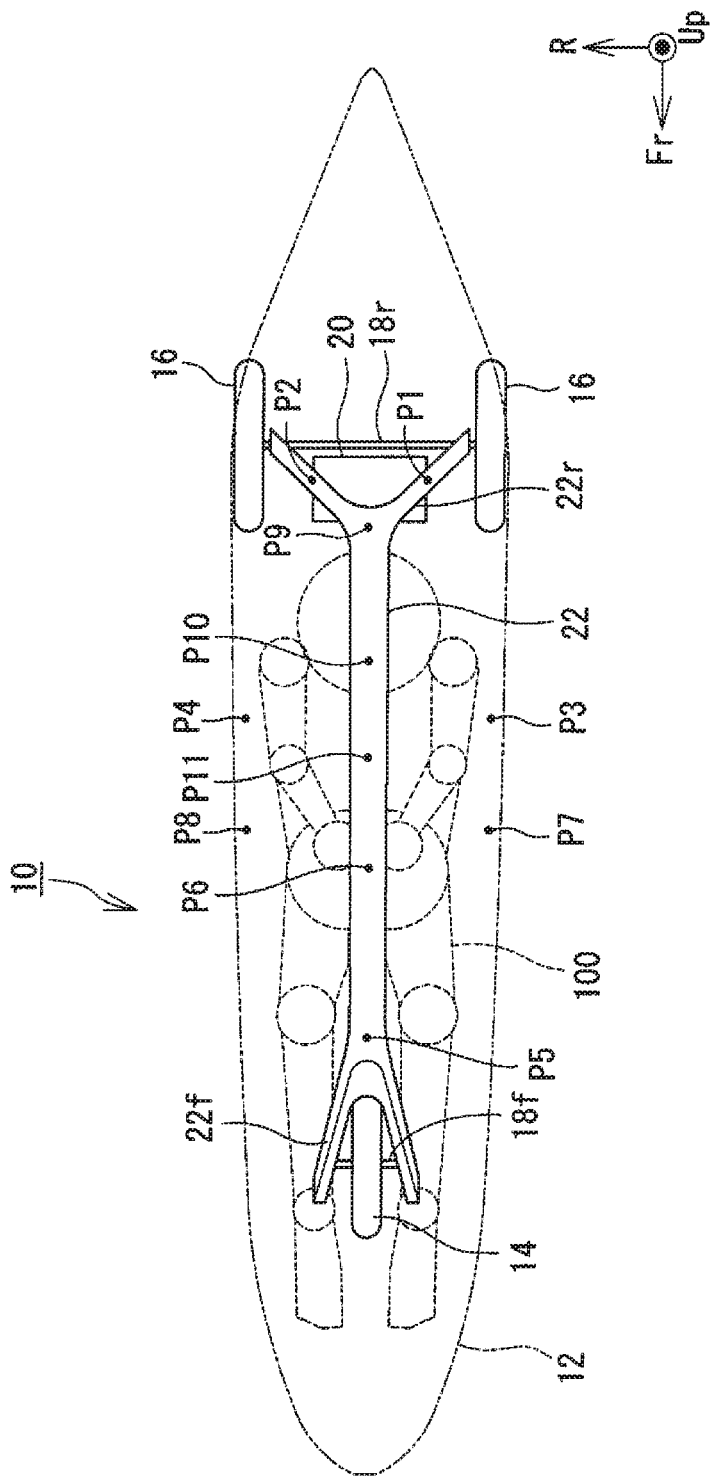
FIG. 1 is a schematic plan view of a vehicle in which a hanging type seat is mounted.
Figure 2:
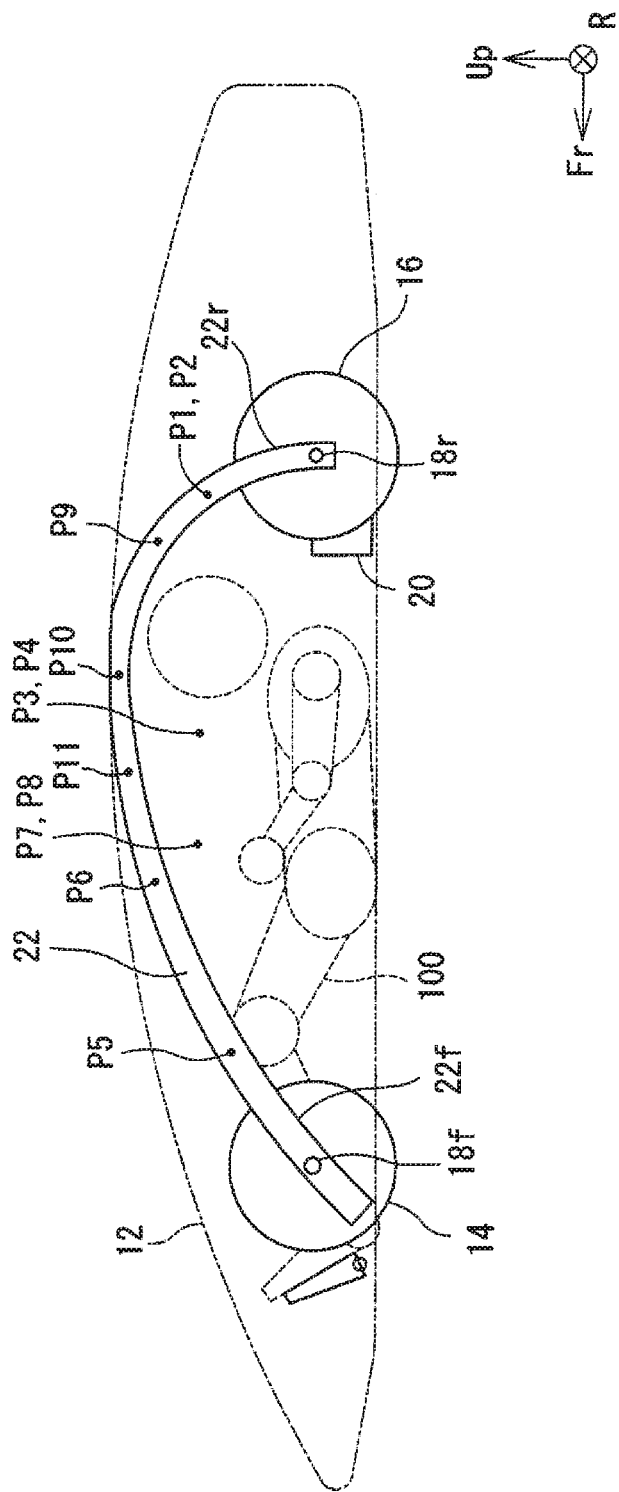
FIG. 2 is a schematic side view of the vehicle in which the hanging type seat is mounted.
Figure 3:
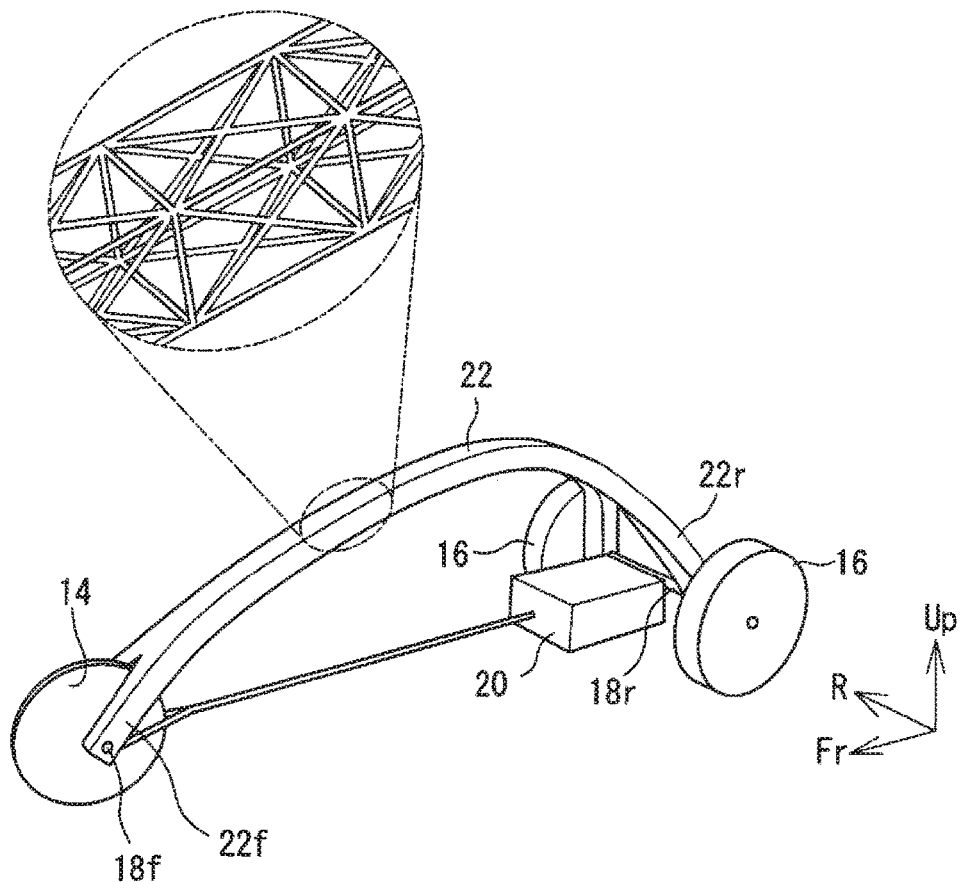
FIG. 3 is a perspective view around an elastic frame.

Before describing the hanging type seat 11, a vehicle in which the hanging type seat 11 is mounted is described with reference to FIG. 1 to FIG. 3. FIG. 1 is a schematic plan view of a vehicle 10 in which the hanging type seat 11 is mounted, and FIG. 2 is a schematic side view of the vehicle 10. FIG. 3 is a schematic perspective view of an elastic frame 22 mounted in the vehicle 10. This vehicle is a small vehicle for one person. The vehicle 10 is an electric motor vehicle having an electric motor (not shown) as a power source. This vehicle 10 may be a non-autonomous vehicle in which the occupant 100 performs all of dynamic driving operations or may be a drive-assistance vehicle or an autonomous vehicle that automatically performs some or all of the dynamic driving operations.

The vehicle 10 has a body 12 with such a shape resembling a boat turned upside down (FIG. 1 and FIG. 2 show a body outline indicated by a chain double-dashed line). The hanging type seat 11 (not shown in FIG. 1) described later is mounted in a posture such that its front-back direction is parallel with the vehicle longitudinal direction. The vehicle 10 has therein the elastic frame 22 which is mounted at the center position in the vehicle lateral direction to extend in the vehicle longitudinal direction. FIG. 2 shows that the elastic frame 22 has a substantially circular arc shape so as to protrude upward in a side view. Front and rear portions of the elastic frame 22 are respectively divided into two in the vehicle lateral direction. In the following description the front side two-forked portion is called a "front two-forked portion $22f$" and the rear side two-forked portion is called a "rear two-forked portion $22r$". The elastic frame 22 has appropriate elasticity, and vibration inputted from a road surface when the vehicle is travelling is partially absorbed by the elastic frame 22 which is elastically deformed. For example, the elastic frame 22 may be configured to have a lattice structure in which gratings branched into a branch shape are arranged periodically.

The vehicle 10 is a three-wheel vehicle having a single front wheel 14 and two rear wheels 16. The front wheel 14 is arranged in the front two-forked portion $22f$ of the elastic frame 22. A front axle $18f$ is mounted in the front two-forked portion $22f$. In addition, the rear wheels 16 are arranged outside the rear two-forked portion $22r$ of the elastic frame 22, and a rear axle $18r$ is mounted to the rear two-forked portion $22r$. In other words, it can be said that the elastic frame 22 connects the front axle $18f$ and the rear axle $18r$. A battery 20 for supplying electricity to a driving motor (not shown) is arranged in front of the rear axle $18r$ and below the elastic frame 22 in the vehicle.

The occupant 100 sits on the seat to lie on his/her back below the elastic frame 22. The hanging type seat 11 is mounted in the vehicle 10 to support the seated occupant 100 in the above posture. Next, the structure of the hanging type seat 11 is described below in detail.

Figure 4:
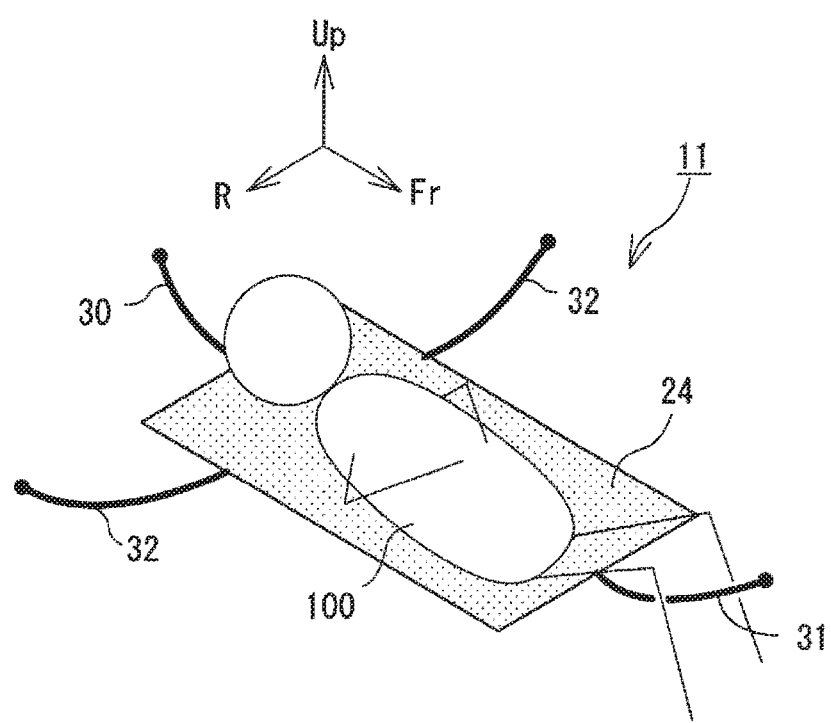
FIG. 4 is a schematic view showing an example of a basic hanging type seat.
Figure 5:
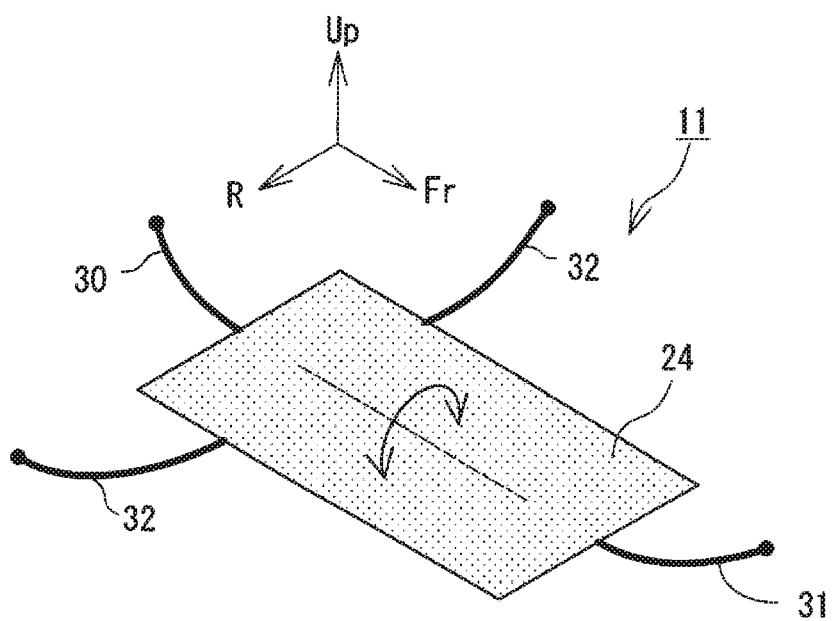
FIG. 5 is a schematic view showing an example of the basic hanging type seat.

FIG. 4 and FIG. 5 are schematic views showing an example of the basic hanging type seat 11. The hanging type seat 11 has a seat main body 24 for supporting the occupant 100 from below, and plural hanging tools 30, 31, 32 for hanging and holding the seat main body 24. The seat main body 24 is not particularly restricted so long as at least the upper half body of the occupant 100 can be positioned on it. Therefore, the seat main body 24 may be made of a hard material which can keep a specific shape or may be made of a flexible material (such as cloth, a resin sheet, a net-like member, or the like) which is flexibly deformable according to the body type of the occupant 100. An additional cushion pad (not shown) may be placed on the seat main body 24 to improve riding comfort for the occupant 100.

One or more front hanging tools 31 (one in FIG. 4 and FIG. 5) are extended from a front part of the seat main body 24. Each front hanging tool 31 is passed across the front part of the seat main body 24, extended upward in the front-back direction (forward in FIG. 4 and FIG. 5), and attached to a structure in the vehicle. One or more rear hanging tools 30 (one in FIG. 4 and FIG. 5) are extended from a rear part of the seat main body 24. Each rear hanging tool 30 is passed across the rear part of the seat main body 24, extended upward in the front-back direction (rearward in FIG. 4 and FIG. 5), and attached to a structure in the vehicle. In addition, two or more transverse hanging tools 32 (two in FIG. 4 and FIG. 5) are extended from both sides of the seat main body 24. Each transverse hanging tool 32 is passed across both sides of the seat main body 24, extended upward laterally (outward in the lateral direction in FIG. 4 and FIG. 5), and attached to a structure in the vehicle.

Here, each of the hanging tools 30, 31, 32 is not limited to a specific structure so long as it is a long member having a certain degree of strength durable to a load of the occupant 100. Therefore, each of the hanging tools 30, 31, 32 may be a linear member, a wide belt-like member, or a chain-like member having plural ring-shaped elements connected. Moreover, the hanging tools 30, 31, 32 are not limited to any specific material and may be made of, for example, natural fibers, chemical fibers, metal, or a combination thereof. All of the hanging tools 30, 31, 32 may have the same structure, or they may have different structures. For example, the transverse hanging tool 32 which easily interferes with the body of the occupant 100 may be made of natural fibers, and the rear hanging tool 30 and the front hanging tool 31 may be made of a metal wire.

The structure in the vehicle, to which the hanging tools 30, 31, 32 are attached, is not limited particularly so long as the structure can withstand a weight of the occupant 100. Therefore, the hanging tools 30, 31, 32 may be attached to, for example, the elastic frame 22 or the vehicle body 12. The hanging tools 30, 31, 32 may be unseparably fixed or detachably attached to the structure in the vehicle. For example, a hook may be provided on the car interior structure, and one of the ends of the hanging tools 30, 31, 32, and a loop, which can be detachably hooked to the hook, may be provided on the other end.

In any case, the hanging tools 30, 31, 32 extended from the seat main body 24 are attached to the car interior structure positioned higher than the seat main body 24, so that the seat main body 24 is hung and held. When the above-described hanging type seat is used as the vehicle-mounted seat, the weight of the vehicle-mounted seat can be reduced significantly. In other words, many of the conventional vehicle-mounted seats have a seat part, and a backrest part which is erected from the seat part. In such a case, the backrest part is generally provided with a hard and heavy skeleton member which is made of metal to maintain the backrest part in an upright posture (to prevent the backrest part from falling unexpectedly). However, when the skeleton member is provided, the vehicle-mounted seat has an increased weight, causing an increase in fuel consumption or electric power consumption of the vehicle 10.

Meanwhile, since this example is configured to hang the seat main body 24, the posture of the seat main body 24 is automatically maintained at a position where tensions of the hanging tools 30, 31, 32 are balanced with a force (gravity or inertia force) applied to the occupant 100. As a result, the skeleton member for maintaining the posture of the seat main body 24 becomes unnecessary in this example, and the weight of the whole seat can be reduced significantly.

In addition to the front hanging tool 31 and the rear hanging tool 30 extended from both of the front and rear sides of the seat main body 24, a pair of transverse hanging tools 32 are also provided to extend from both right and left sides of the seat main body 24. This configuration can effectively suppress the seat main body 24 from swinging, a so-called rolling movement, about the longitudinal axis. In other words, when the seat main body 24 is hung and held only by the front hanging tool 31 and the rear hanging tool 30 without having the transverse hanging tools 32, the seat main body 24 is swung easily around the longitudinal axis. Especially, when the vehicle is narrow and long in the longitudinal direction as shown in FIG. 1 and FIG. 2, the rolling movement tends to occur when the vehicle travels. If the seat main body 24 and the occupant 100 on the seat main body 24 suffer from a rolling movement, the occupant 100 has an instable posture, and the stability of various operations is deteriorated. When the chest and/or the head of the occupant 100 is moved repeatedly, the riding comfort lowers, occasionally causing movement sickness.

This example has two or more transverse hanging tools 32 in addition to the front hanging tool 31 and the rear hanging tool 30 as described above. Thus, the rolling movement of the seat main body 24 is controlled by the transverse hanging tools 32, so that the rolling movement of the seat main body 24 is effectively suppressed, and the occupant 100 can be supported more stably.

Figure 6:
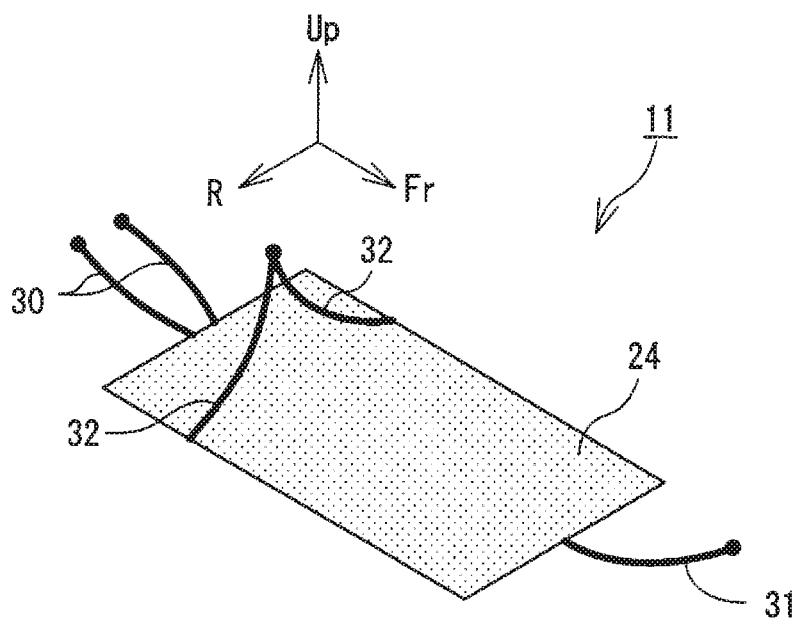
FIG. 6 is a schematic view showing a modification of the hanging type seat.

The hanging type seat 11 shown in FIG. 4 and FIG. 5 has a basic structure, which may be changed appropriately. For example, it may be the case that the transverse hanging tools 32 are not extended outward in the lateral direction but are extended inward in the lateral direction as shown in FIG. 6. Also, the front hanging tool 31 and the rear hanging tool 30 may be extended not only outward but also inward in the front-back direction. As shown in FIG. 6, the rear hanging tool 30 may be provided in plural (two in FIG. 6). In this case, the plural rear hanging tools 30 may be arranged in a mirror image pattern with the center line in the lateral direction of the seat main body 24 as a symmetry axis. Similarly, the front hanging tool 31 may also be provided in plural. In such a case, the plural front hanging tools 31 may be mirror-image arranged with the center line in the lateral direction of the seat main body 24 as a symmetry axis.

Figure 7:
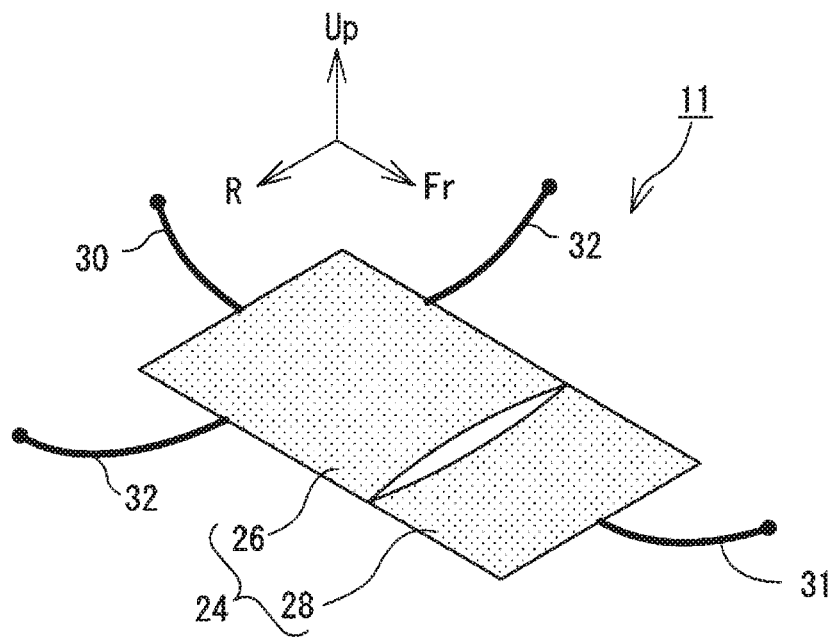
FIG. 7 is a schematic view showing another modification of the hanging type seat.

The seat main body 24 may be divided into several parts. For example, FIG. 7 shows that the seat main body 24 may be divided into a first support member 26 for supporting at least the back of the occupant 100 from below and a second support member 28 for supporting the buttocks of the occupant 100 from below. By configuring in this way, the movements of the upper half body including the back of the occupant 100 and the movement of the lower half body including the buttocks can be divided, and the movements of the upper and lower half bodies can be adjusted separately. In this case, the first support member 26 and the second support member 28 may have different structures from each other. For example, the first support member 26 is formed of a flexibly deformable flexible material (such as a sheet material or a net material), and the second support member 28 may be formed of a hard material (such as a hard plastic or a metal) which has poorer flexibility than the first support member 26. In this case, the second support member 28 may be configured to be partly connected to the first support member 26 only. For example, only both ends in the lateral direction of the second support member 28 are connected to the first support member 26, and the middle part in the lateral direction of the second support member 28 may be configured to be in a freely movable state without being connected to the first support member 26. By configuring in this way, the movements of the upper half body and the lower half body can be divided more clearly.

In this case, the movements of the first and second support members 26 and 28 may be adjusted so as to suppress the rolling movement of the upper half body more than the rolling movement of the lower half body. By configuring in this way, the vibration inputted through the vehicle 10 from a road surface when it is travelling can be absorbed by the rolling movement of the lower half body, and the position and posture of the upper half body can be further stabilized. The above configuration can be obtained by extending the two or more transverse hanging tools 32 from both sides of the first support member 26 but not providing any transverse hanging tool 32 being extended from the second support member 28 as shown in FIG. 7 for example.

Figure 8:
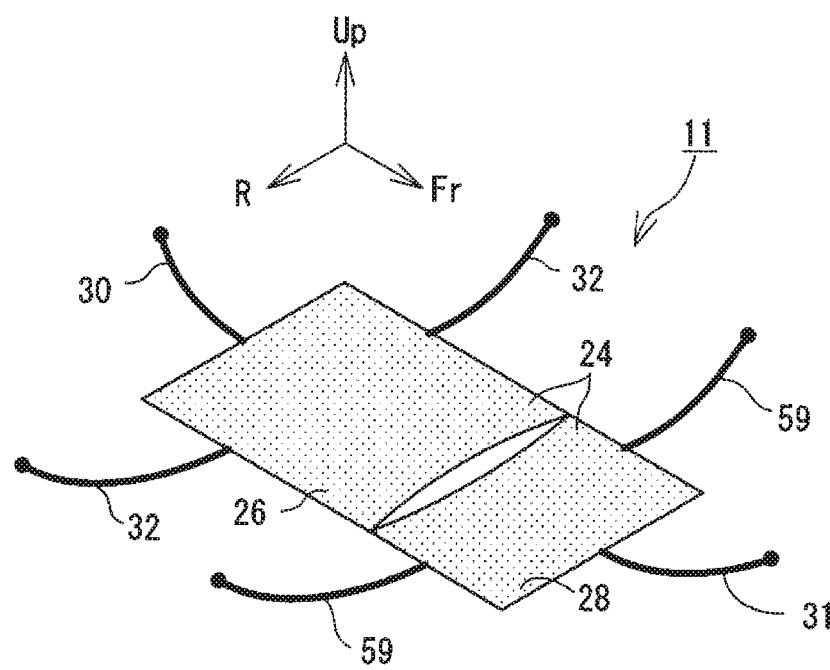
FIG. 8 is a schematic view showing another modification of the hanging type seat.

To suppress the rolling movement of both of the upper half body and the lower half body, the movements of the first and second support members 26 and 28 may be adjusted. The above configuration can be obtained by extending two or more transverse hanging tools 32 from both sides of the first support member 26 and also providing two or more second transverse hanging tools 59 extended from the second support member 28 as shown in FIG. 8, for example.

Figure 9:
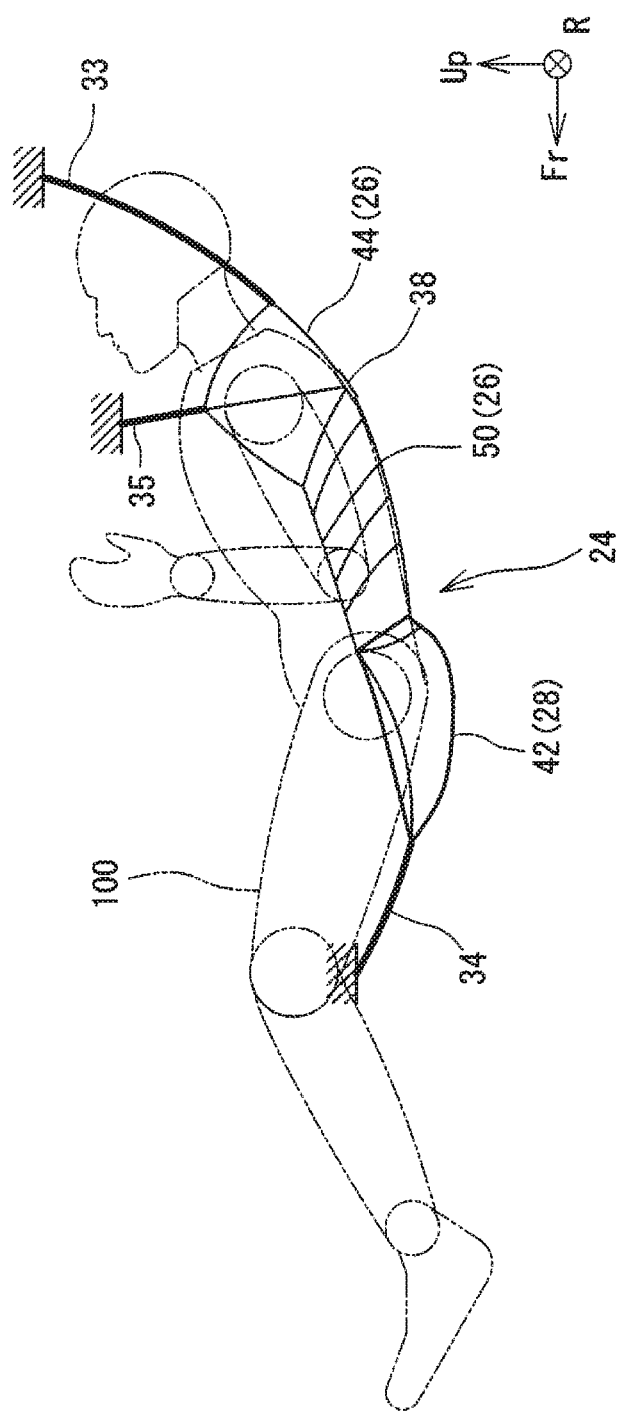
FIG. 9 is a side view showing a first specific example of the hanging type seat.
Figure 10:
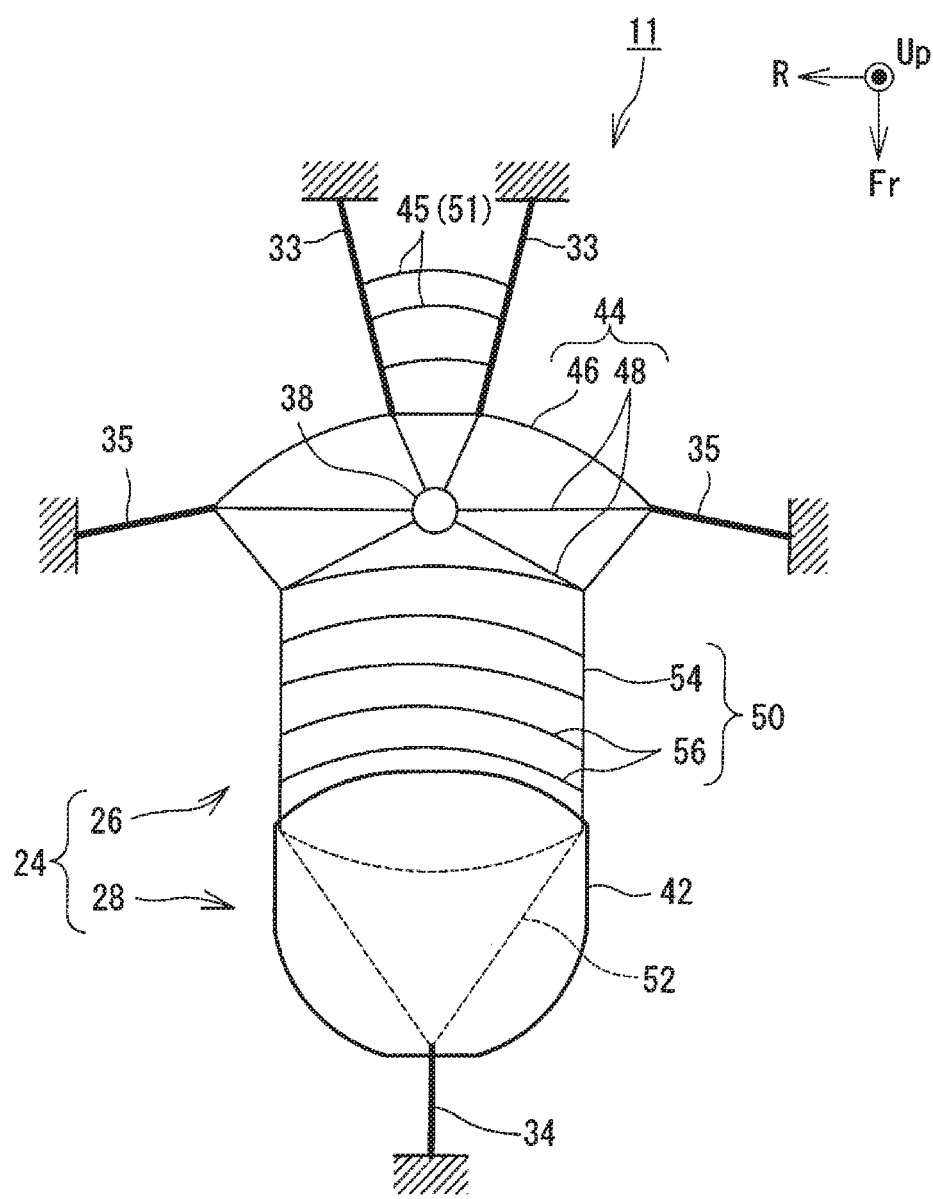
FIG. 10 is a plan view showing the first specific example of the hanging type seat.

Next, a more specific example of the configuration of the hanging type seat 11 is described. FIG. 9 and FIG. 10 are a side view and a plan view of the hanging type seat 11 in a first specific example. This hanging type seat 11 has the seat main body 24 and hanging wires 33, 34, 35 which function as the hanging tools 30, 31, 32. All of the hanging wires 33, 34, 35 are formed by twisting a metal wire into a single layer or multiple layers. The seat main body 24 is divided into the first support member 26 and the second support member 28.

The first support member 26 is made of a net member which is formed by combining plural wires into a net form, and it is generally divided into a nest portion 44 and a ladder portion 50. The nest portion 44 is formed by weaving the wires into a spider-web shape. The nest portion 44 comprises a frame wire 46 which is spread in an approximately polygonal shape and plural radial wires 48 which are radially extended from the center of the frame wire 46 to reach the frame wire 46. The nest portion 44 supports the shoulder portion and its periphery of the occupant 100.

Figure 11:
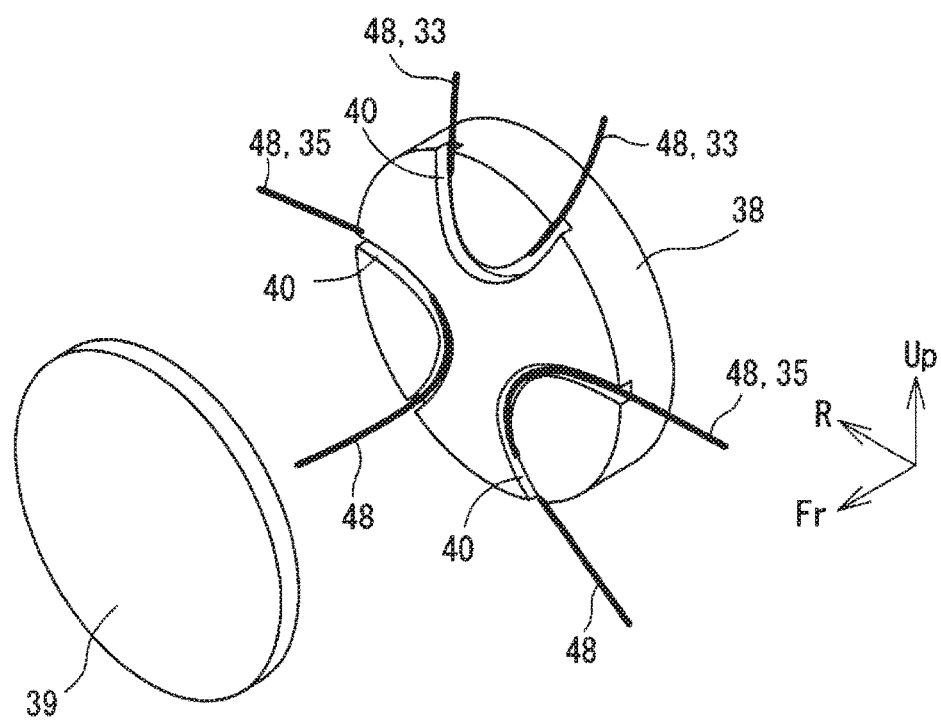
FIG. 11 is a perspective view of a reference plate.

A reference plate 38 is provided at the center of the nest portion 44. FIG. 11 is a perspective view of the reference plate 38. The reference plate 38 is a disk-like member formed with three engaging grooves 40 which are circumferentially arranged side by side on its surface. The radial wires 48 are respectively inserted into and caught by the respective engaging grooves 40. As is apparent from FIG. 11, each engaging groove 40 has an inverted U-shape which is radially open outward in a planar view. Therefore, the radial wires 48 inserted into the engaging grooves 40 and extended along the engaging grooves 40 make a U-turn within the reference plate 38. Thus, the six radial wires 48 (which are actually three U-turned wires) are extended radially from the reference plate 38. A flat plate lid 39 may be attached to the front surface of the reference plate 38 to prevent the radial wires 48 from falling out from the engaging grooves 40.

Among the radial wires 48, two radial wires 48 extended rearward (which are actually a U-turned single wire) extend beyond the frame wire 46 to become the rear hanging wires 33. In this example, plural cross wires 45 are bridged between the two rear hanging wires 33 to configure a headrest portion 51 on which the head of the occupant 100 is positioned. Among the radial wires 48, two radial wires 48 extended in the lateral direction extend beyond the frame wires 46 to become the transverse hanging wires 35. In other words, start points of the rear hanging wire 33 and the transverse hanging wire 35 become the reference plate 38. In addition, the engaging grooves 40 in the reference plate 38 function as an engaging portion where the starting points of the rear hanging wires 33 and the transverse hanging wires 35 are engaged. Thus, the reference plate 38 having the engaging portions (engaging grooves 40) is provided to easily position the rear hanging wires 33 and the transverse hanging wires 35.

Since the rear hanging wires 33 and the transverse hanging wires 35 have their starting points at the same reference plate 38, the first support member 26 is stably hung on the basis of the reference plate 38. As a result, the riding comfort for the occupant 100 can be improved. In addition, a rolling movement around the chest of the occupant 100 can be reduced by having the above configuration. In other words, the rolling movement of the seat main body 24 is regulated by the transverse hanging wires 35, so that the rolling movement toward the transverse hanging wires 35 is further suppressed. In this example, the reference plate 38 is positioned close to the scapula or the chest of the occupant 100. Extending the transverse hanging wires 35 with the reference plate 38 as the starting point can effectively suppress the rolling movement around the chest of the occupant 100, and the riding comfort for the occupant 100 can be further improved.

Figure 12:
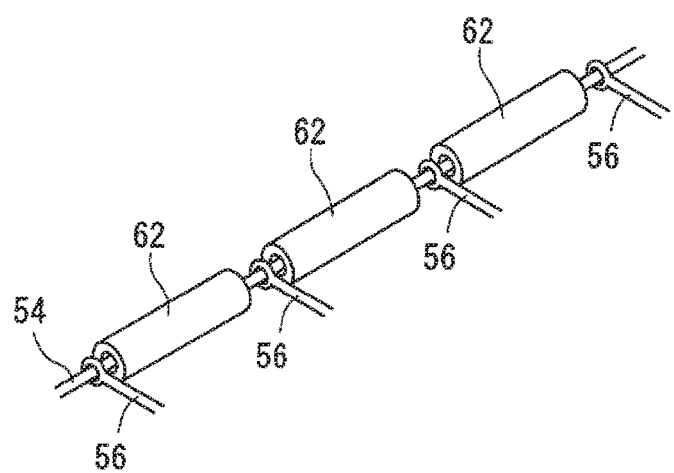
FIG. 12 is a partial perspective view of a ladder portion.

The ladder portion 50 is connected to the front end of the nest portion 44. The ladder portion 50 includes a pair of side wires 54 which are extended in the front-back direction, and plural cross wires 56 are bridged between the pair of side wires 54. The ladder portion 50 receives an area from the chest to the waist of the occupant 100 on it. Collars 62 having a prescribed length may be used to keep arrangement intervals among the cross wires 56. That is, as shown in FIG. 12, the collars 62 may be inserted on the side wires 54 so that the collars 62 and the joining points between the cross wires 56 and the side wires 54 are arranged alternately. In such a configuration, the arrangement intervals of the cross wires 56 are defined according to the length of the collars 62.

It is apparent from the above description that the first support member 26 for supporting the back of the occupant 100 is made of a net-like member which is formed by combining plural wires. By configuring in this way, the first support member 26 is flexibly deformed according to the body size of the occupant 100. Accordingly, the occupants 100 of various body sizes can be supported stably.

The second support member 28 is connected to the front end of the ladder portion 50. The second support member 28 includes a support pan 42 where the buttocks of the occupant 100 are positioned and a triangular wire 52 for supporting the support pan 42 from below. The support pan 42 is a molded product which is recessed downward so as to receive the buttocks therein and is made of, for example, plastic or the like. This support pan 42 is restrained and supported by the triangular wire 52 provided below it. The triangular wire 52 comprises three wires which are mutually connected to form an approximately triangular shape. In addition, two vertices of the triangular wire 52 are connected to both lateral ends at the front end of the ladder portion 50. Here, the ladder portion 50 and the triangular wire 52 can be deformed relatively freely because they are formed of a wire having a certain degree of flexibility. As a result, the second support member 28 is movable relatively easily with respect to the first support member 26.

The above-described seat main body 24 is hung and held by the rear hanging wires 33, the front hanging wire 34, and the transverse hanging wires 35. As described above, the rear hanging wires 33 are extended upward and rearward from the reference plate 38, passed across the front part of the seat main body 24, and fixed to points P1 and P2 of the elastic frame 22. The points P1 and P2 are present on the rear two-forked portion 22r of the elastic frame 22 as shown in FIG. 1 and FIG. 2.

The transverse hanging wires 35 are extended from the reference plate 38 upward and outward in the lateral direction, passed across both sides of the seat main body 24, and fixed to points P3 and P4 of the elastic frame 22. The points P3 and P4 are present on the vehicle body 12. The front hanging wire 34 is extended upward and forward from the vertex of the front end (namely, the front part of the seat main body 24) of the triangular wire 52 and fixed to point P5 of the elastic frame 22. The point P5 is present slightly rearward from the front two-forked portion 22f of the elastic frame 22.

As described above, the seat main body 24 in this example is divided into the first support member 26 and the second support member 28 and hung and held by the hanging wires 33, 34, 35. According to such a configuration, a hard and heavy frame becomes unnecessary, and the weight of the seat main body 24 can be reduced considerably, similar to the example shown in FIG. 7. This example has the transverse hanging wires 35 in addition to the rear hanging wires 33 and the front hanging wire 34, so that the rolling movement of the seat main body 24 can be suppressed effectively. As a result, the posture of the occupant 100 is stabilized, so that motion sickness is not caused easily, and favorable riding comfort is obtained. Specially, the transverse hanging wires 35 in this example are attached to only the first support member 26 but not to the second support member 28. By configuring in this way, the second support member 28 causes a rolling movement more easily than the first support member 26, and the lower half body of the occupant 100 has a rolling movement more easily than the upper half body. As a result, vibration inputted from a road surface is solely absorbed by the rolling movement of the lower half body, and the movement of the upper half body is suppressed more effectively. Accordingly, the postures of the chest and the head of the occupant 100 are more stabilized, and the riding comfort is improved further.

Since the rolling movement of the first support member 26 itself is suppressed by the transverse hanging wires 35 as described above, the occupant 100 can easily turn over. Therefore, when this hanging type seat 11 is mounted in the autonomous vehicle, for example, the occupant 100 can turn over relatively easily. Thus, the onset of an economy class syndrome can be prevented effectively even when riding on the vehicle for a long period of time.

In this example, the rear hanging wires 33 and the front hanging wire 34 are attached to the elastic frame 22 having appropriate elasticity. By configuring in this way, vibration inputted from a road surface is partially not transmitted to the hanging wires 33 and 34 but absorbed by elastic deformation of the elastic frame 22. As a result, the riding comfort for the occupant 100 can be further improved.

It is apparent from the above description that the seat main body 24 is hung below the elastic frame 22 having a substantially circular arc shape in this example, and the battery 20 is arranged between the seat main body 24 and the rear end of the elastic frame 22. By configuring in this way, the impact at a time of a rear collision can be absorbed by the elastic frame 22 and the battery 20, and the occupant 100 can be protected. In other words, if the vehicle 10 suffers from a rear collision, a forward collision load is inputted to the rear portion of the elastic frame 22, and the rear portion of the elastic frame 22 is elastically deformed to move forward. The collision load is partially absorbed by the elastic deformation. By the forward movement of the rear portion of the elastic frame 22, the rear axle 18r mounted to the elastic frame 22 collides with the battery 20. The collision load can be received by the battery 20 because it is generally hard and stiff. Accordingly, the input of the collision load to the occupant 100 on the seat main body 24 can be reduced, and the occupant 100 can be protected appropriately.

Figure 13:
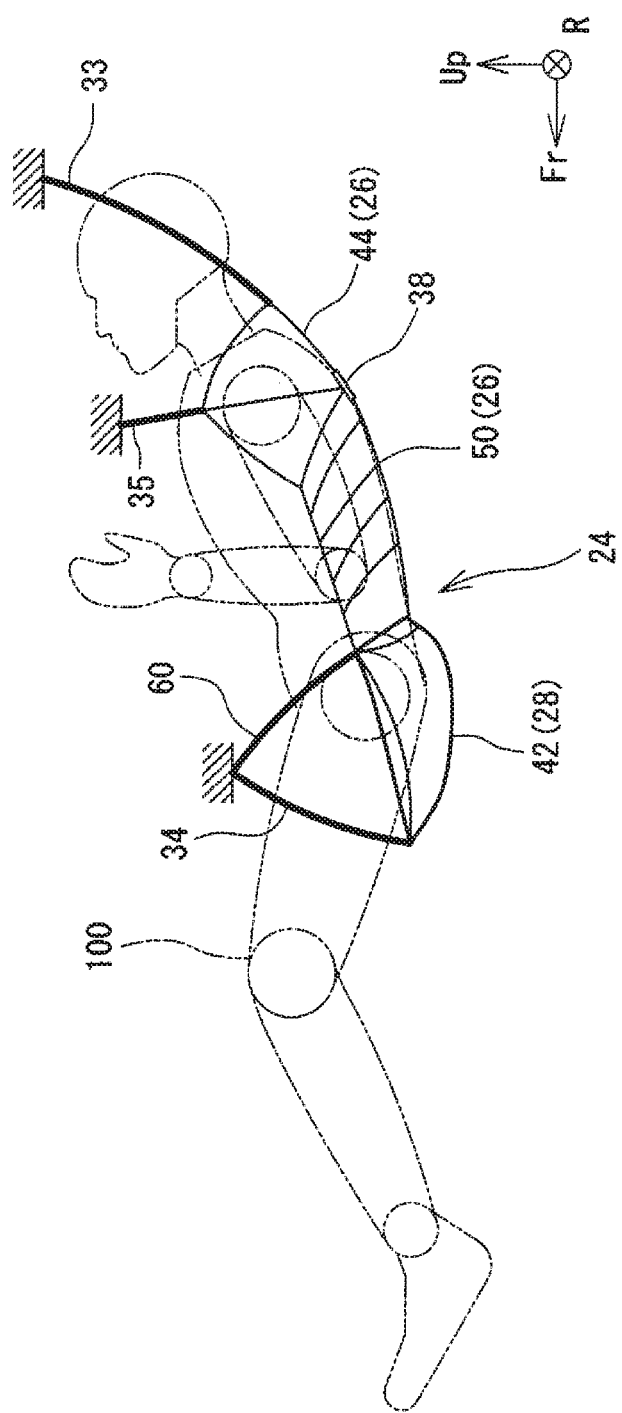
FIG. 13 is a side view showing a second specific example of the hanging type seat.
Figure 14:
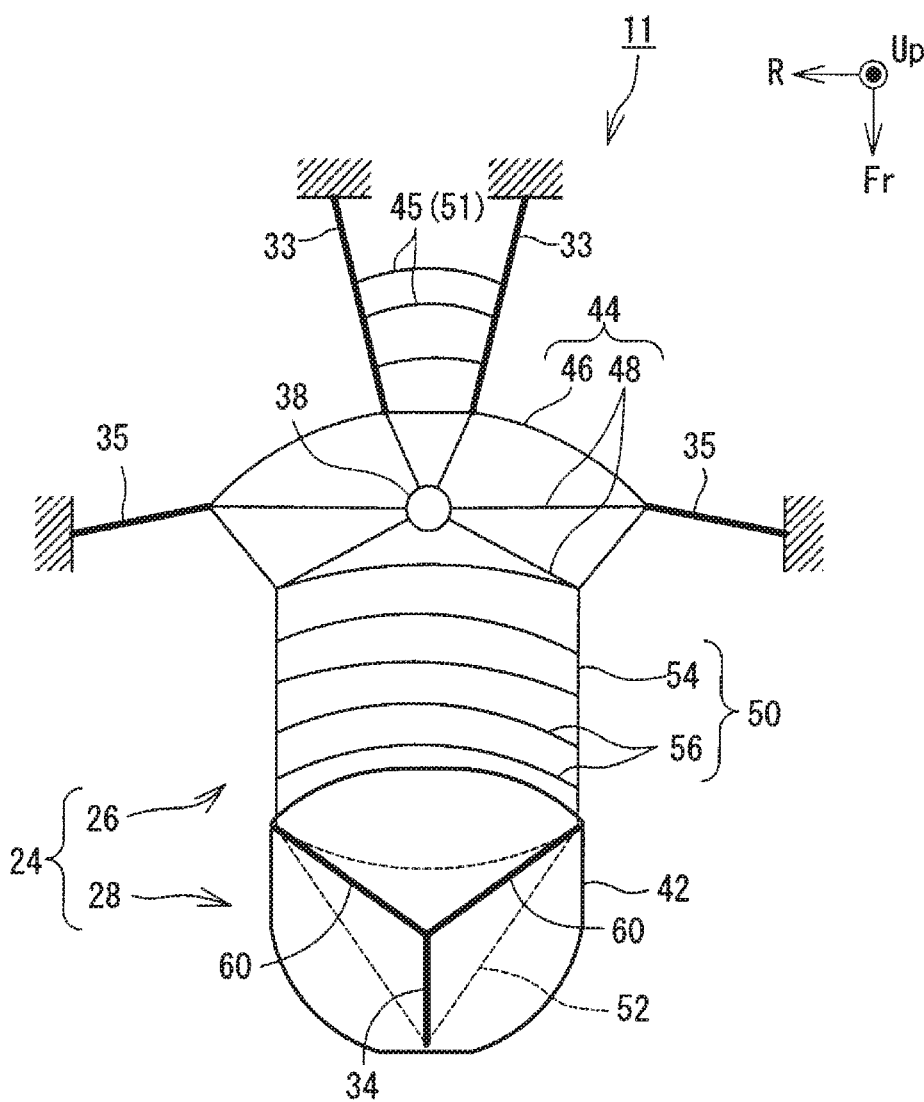
FIG. 14 is a plan view showing the second specific example of the hanging type seat.
Figure 15:
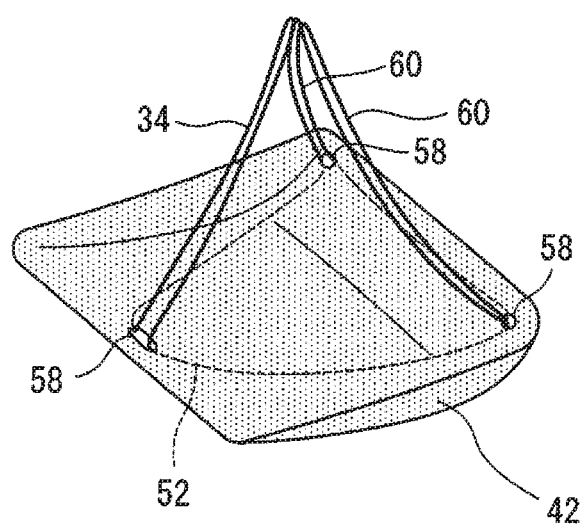
FIG. 15 is a schematic perspective view of a second support member according to the second specific example.

Next, a specific example of another hanging type seat 11 is described with reference to FIG. 13 to FIG. 15. FIG. 13 and FIG. 14 are a side view and a plan view of the hanging type seat 11 in a second specific example. FIG. 15 is a perspective view of the second support member 28 in this specific example. This hanging type seat 11 has the second support member 28 which is hung differently from the one in the first specific example. Specifically, the front hanging wire 34 in the second specific example is not extended upward and forward but extended upward and rearward from the front end of the second support member 28 and fixed to point P6 of the elastic frame 22. The second support member 28 is also provided with two second transverse hanging wires 60. The second transverse hanging wires 60 are respectively extended upward and laterally inward from both lateral ends at the front end of the second support member 28. The second transverse hanging wires 60 are fixed to the same point as that of the front hanging wire 34; namely, the point P6 of the elastic frame 22.

Thus, the transverse hanging wires 60 are attached to the first support member 26 and also to the second support member 28, so that the second support member 28 and also the lower half body of the occupant 100 resist performing a rolling movement. In the first specific example, the rolling movement of the upper half body of the occupant 100 is suppressed by positively allowing the rolling movement of the lower half body. However, a degree of suppressing the rolling movement of the lower half body is variable depending on a structure of the vehicle 10 mounted with the hanging type seat 11, a condition of a road surface where the vehicle travels, a purpose of travelling, etc. Therefore, the second specific example is appropriate when the rolling movement of the lower half body is desired to be suppressed to some extent.

The two second transverse hanging wires 60 in this example are extended not outward but inward of the seat main body 24. By configuring in this way, the occupant 100 is prevented from sliding sideways from the seat main body 24. Thus, the occupant 100 can be effectively prevented from falling from the seat main body 24 against an intention of the occupant 100.

Incidentally, the front hanging wire 34 and the second transverse hanging wires 60 may be independent from one another or may be connected mutually. For example, three insertion holes 58 are formed on the support pan 42, and the triangular wire 52 may be partly pulled upward through the insertion holes 58 so as to be used as the front hanging wire 34 and the second transverse hanging wires 60 as shown in FIG. 15.

Figure 16:
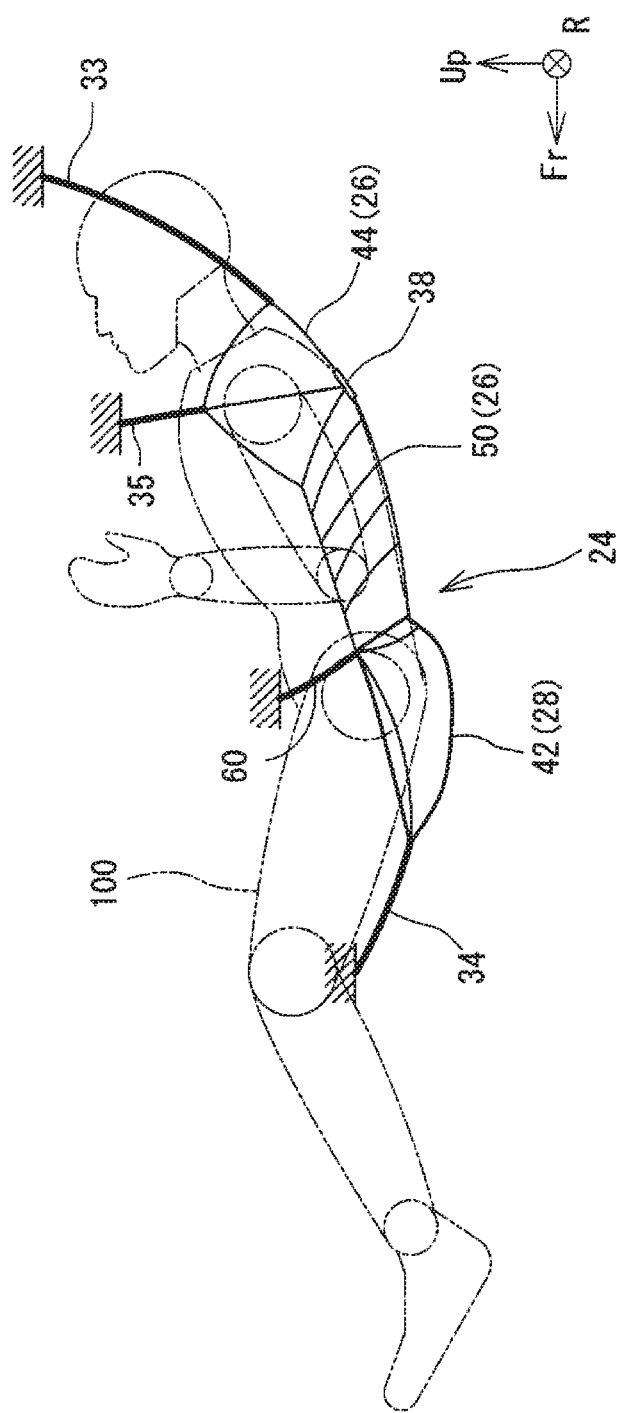
FIG. 16 is a side view showing a third specific example of the hanging type seat.
Figure 17:
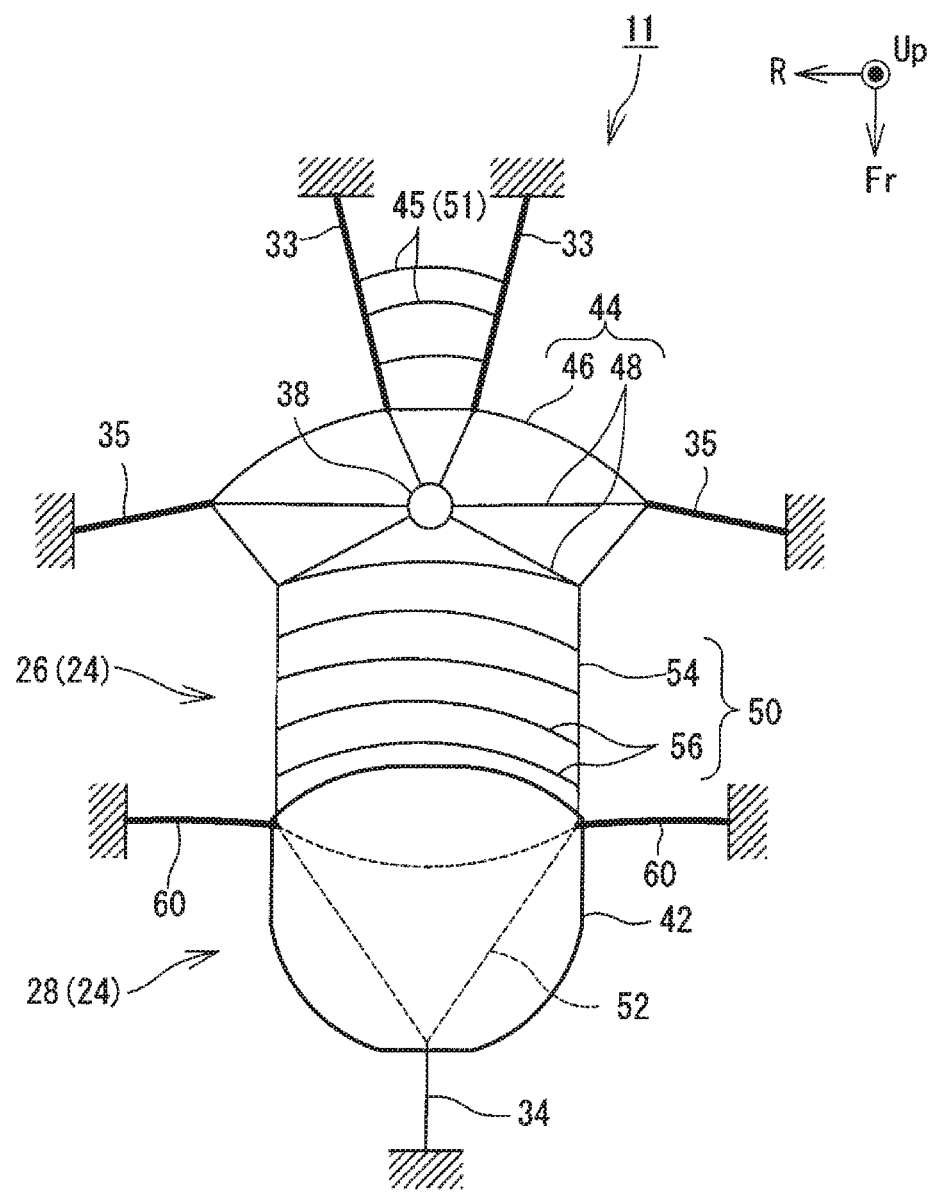
FIG. 17 is a plan view showing the third specific example of the hanging type seat.

Next, another specific example of the hanging type seat 11 is described with reference to FIG. 16 and FIG. 17. FIG. 16 and FIG. 17 are a side view and a plan view of the hanging type seat 11 of a third specific example. This hanging type seat 11 is different from that of the first specific example in the point that the second transverse hanging wire 60 is attached to the second support member 28. In the third specific example, the second transverse hanging wires 60 are extended upward and outward in the lateral direction from both lateral ends at the front end of the second support member 28 and connected to points P7 and P8 present on the vehicle body 12.

That is, in the third specific example, the transverse hanging wires 60 are also attached to the second support member 28 in addition to the first support member 26, so that the lower half body of the occupant 100 also resists performing the rolling movement in addition to the upper half body as in the second specific example. Since the second transverse hanging wires 60 are extended outward in the lateral direction, in comparison with the second specific example, the second transverse hanging wires 60 hardly disturb the occupant 100 from getting on and off the seat main body 24.

Figure 18:
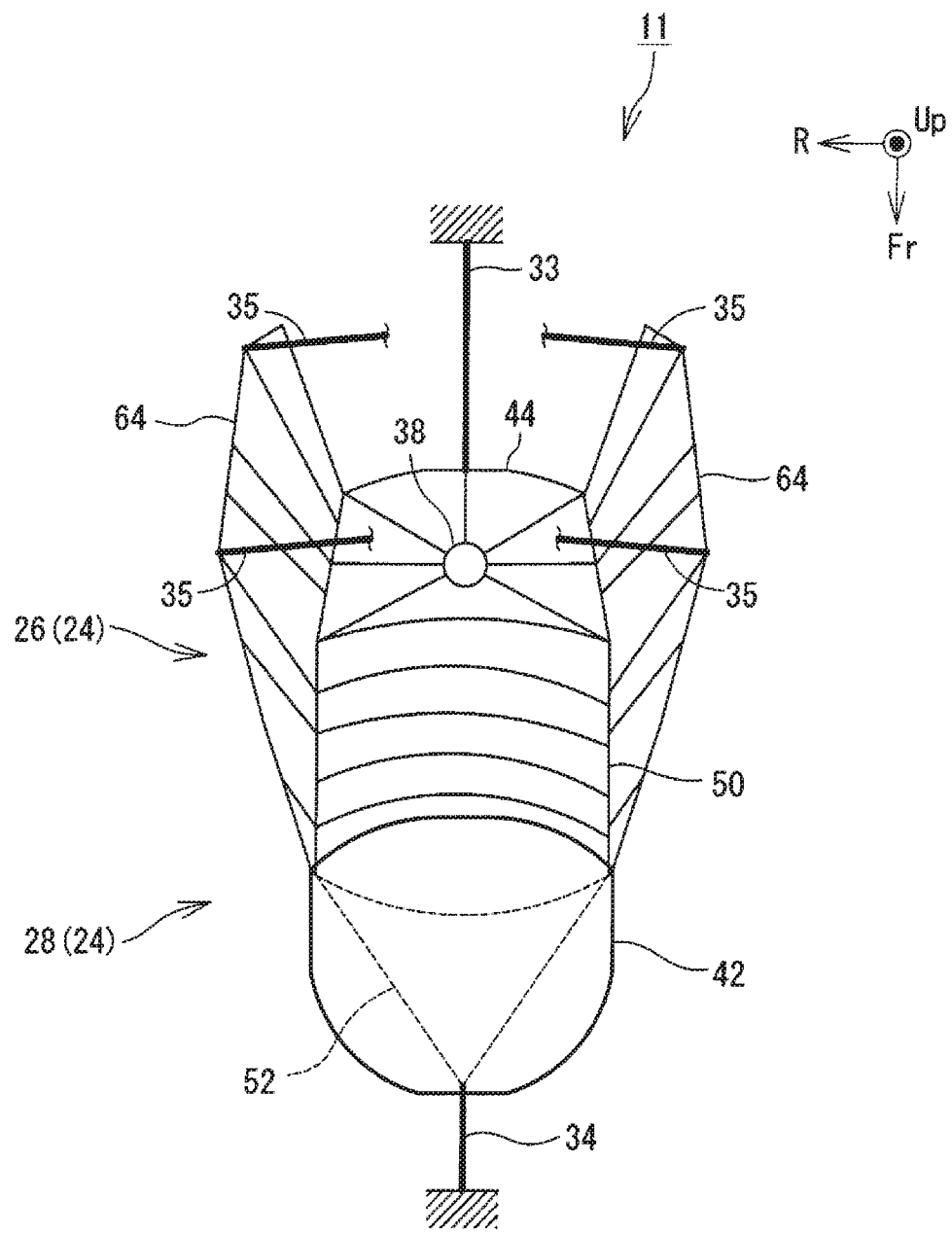
FIG. 18 is a plan view showing a fourth specific example of the hanging type seat.

Next, another specific example of the hanging type seat 11 is described with reference to FIG. 18. FIG. 18 is a plan view of the hanging type seat 11 of a fourth specific example. In the fourth specific example, the first support member 26 also has a pair of side parts 64 in addition to the nest portion 44 and the ladder portion 50. The side parts 64 are connected to both sides of the nest portion 44 and those of the ladder portion 50 and support the shoulders and upper arms of the occupant 100. Two pairs of (namely four) transverse hanging wires 35 are extended upward and laterally inward from the side parts 64 and attached to points P10 and P11 of the elastic frame 22. In addition, one rear hanging wire 33 is extended upward and rearward from the rear end of the nest portion 44 and attached to the point P9 of the elastic frame 22. Further, one front hanging wire 34 is extended upward and forward from the front end of the second support member 28 and connected to the point P5 of the elastic frame 22.

In other words, all of the hanging wires 33, 34, 35 in this example are connected to the elastic frame 22 having elasticity. By configuring in this way, vibration inputted from a road surface is hardly transmitted by virtue of the seat main body 24, and riding comfort is improved furthermore.

The vehicle 10 suffers from a tire distortion due to roll resonance of the whole vehicle 10, which is caused depending on a longitudinal spring constant of tiers of the rear wheels 16 and the roll inertia of the whole vehicle 10 including the occupant 100. In this example, the seat main body 24 is hung from the elastic frame 22 which is coupled with the axle of the rear wheels, so that the occupant 100 sitting on the seat main body 24 can be used as a dynamic damper for suppressing the roll resonance of the vehicle body.

Accordingly, distortion of the rear tires can be minimized, and the rolling resistance can be reduced.

The configurations described above are merely examples, and if the seat main body 24 is at least hung from the structure in the vehicle and held through one or more rear hanging tools 30, one or more front hanging tools 31 and two or more transverse hanging tools 32, other configurations may be modified appropriately. Therefore, the configuration and shape of the seat main body 24 may be changed appropriately. Also, the hanging tools may be changed in configuration, quantity, position and other aspects.

Figure 19:
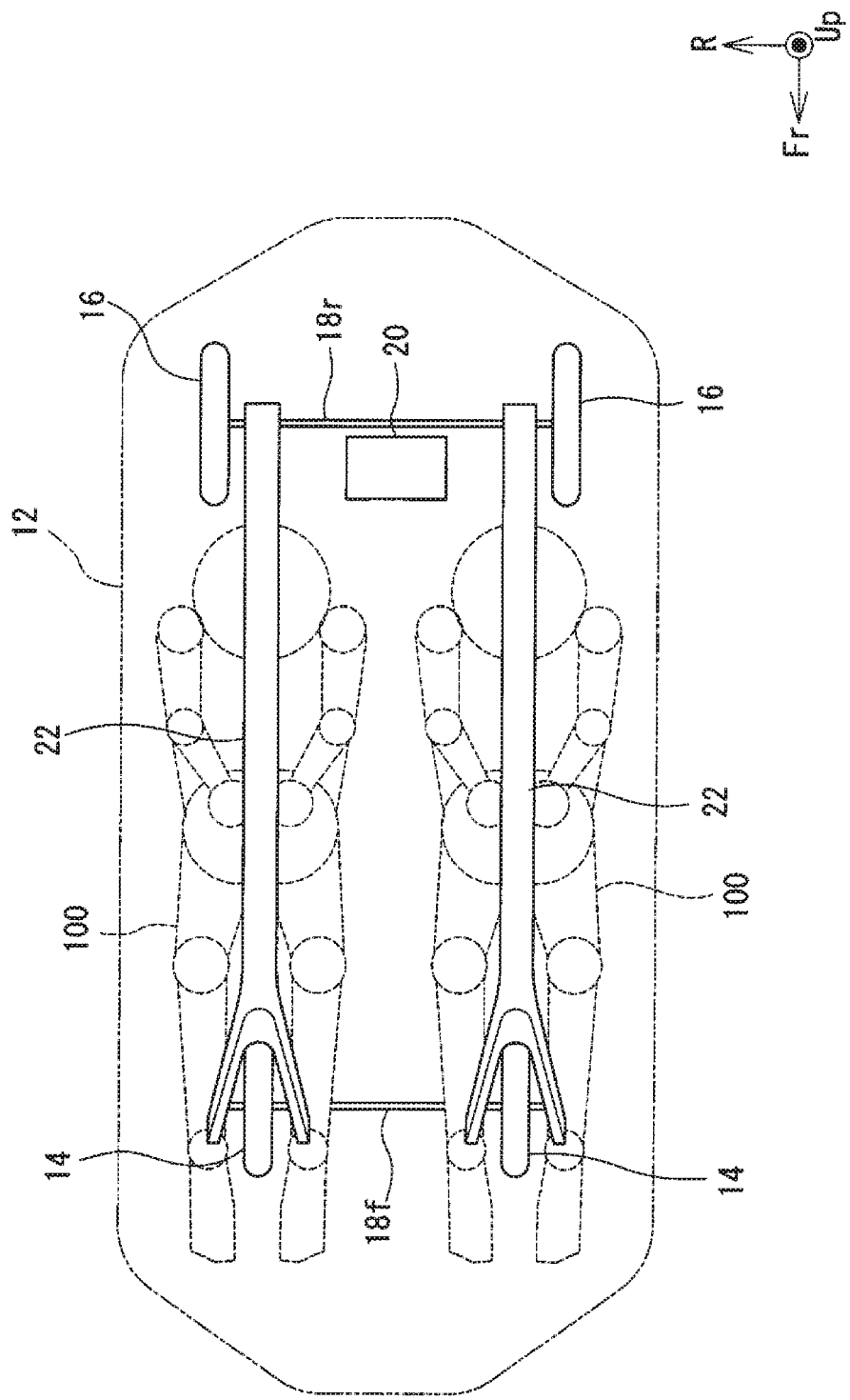
FIG. 19 is a schematic plan view showing an example of another vehicle in which the hanging type seat is mounted.

The hanging type seat 11 mounted in a one-man riding three-wheel vehicle was described above as an example, but the type and form of the vehicle in which the hanging type seat 11 is mounted may be changed appropriately. For example, two hanging type seats 11 may be mounted in a two-seater four-wheel vehicle as shown in FIG. 19. In this case, two elastic frames 22 may be mounted with an interval therebetween in the lateral direction of the vehicle 10. The hanging type seat 11 may also be mounted in a vehicle which does not include the elastic frame 22. Further, both ends of the elastic frame 22 may be coupled to another vehicle body member, such as a vehicle body or a skeleton member, instead of or in addition to the axles 18f and 18r.

REFERENCE SIGNS LIST

10 Vehicle; 11 Hanging type seat; 12 Vehicle body; 14 Front wheel; 16 Rear wheels; 18f Front axle; 18r Rear axle; 20 Battery; 22 Elastic frame; 22f Front two-forked portion; 22r Rear two-forked portion; 24 Seat main body; 26 First support member; 28 Second support member; 30 Rear hanging tool; 31 Front hanging tool; 32 Transverse hanging tool; 33 Rear hanging wire; 34 Front hanging wire; 35 Transverse hanging wire; 38 Reference plate; 39 Lid, 40 Engaging groove; 42 Support pan; 44 Nest portion; 45, 56 Cross wires; 46 Frame wire; 48 Radial wires; 50 Ladder portion; 51 Headrest portion; 52 Triangular wire; 54 Side wire; 58 Insertion hole; 59 Second transverse hanging tool; 60 Second transverse hanging wire; 62 Collars; 64 Side part; 100 Occupant.

The invention claimed is:

1. A hanging type seat mounted in a vehicle, comprising:
a seat main body for supporting an occupant from below;
one or more front hanging tools which are passed across a front part of the seat main body, extended upward in a front-back direction, and attached to a structure in the vehicle;
one or more rear hanging tools which are passed across a rear part of the seat main body, extended upward in the front-back direction and farther rearward in the front-back direction than a rear end of the seat main body, and attached to a structure in the vehicle; and
two or more transverse hanging tools which are passed across opposite side portions of the seat main body along a width of the vehicle, extended laterally upward, and attached to a structure in the vehicle;
wherein: the seat main body is hung and held by the one or more front hanging tools, the one or more rear hanging tools, and the two or more transverse hanging tools.

2. The hanging type seat according to claim 1, wherein the seat main body is at least divided into a first support member on which at least the back of the occupant is configured to be positioned and a second support member on which at least a buttocks of the occupant are configured to be positioned.

3. The hanging type seat according to claim 2, wherein the first support member includes a net member which is configured by combining plural wires into a net form and on which at least the back of the occupant is configured to be positioned.

4. The hanging type seat according to claim 3, wherein the transverse hanging tools are respectively extended from opposite side portions of the first support member but no transverse hanging tool is extended from the second support member.

5. The hanging type seat according to claim 3, wherein the transverse hanging tools are respectively extended from opposite side portions of the first support member and opposite side portions of the second support member.

6. The hanging type seat according to claim 2, wherein the second support member is only partly connected to the first support member.

7. The hanging type seat according to claim 2, wherein the transverse hanging tools extending from opposite side portions of the first support member and the transverse hanging tools extending from opposite side portions of the second support member are spaced apart from each other in the front-back direction.

8. The hanging type seat according to claim 1, further comprising:
   a reference plate which is attached to the seat main body and has engaging portions with which starting points of the hanging tools are engageable, wherein:
   each starting point of at least one of the one or more rear hanging tools and at least two of the two or more transverse hanging tools is engaged with the engaging portions of the reference plate.

* * * * *